(12) United States Patent
Comeau

(10) Patent No.: US 7,701,148 B2
(45) Date of Patent: Apr. 20, 2010

(54) HIGH VOLTAGE CURRENT SPLITTER CIRCUIT AND METHOD

(76) Inventor: Alain Comeau, 440 Duchesneau, Granby, Quebec (CA) J2G 8H6

( * ) Notice: Subject to any disclaimer, the term of this patent is extended or adjusted under 35 U.S.C. 154(b) by 91 days.

(21) Appl. No.: 12/151,350

(22) Filed: May 6, 2008

(65) Prior Publication Data

US 2008/0278001 A1    Nov. 13, 2008

Related U.S. Application Data

(60) Provisional application No. 60/927,865, filed on May 7, 2007.

(51) Int. Cl.
*G05F 1/00* (2006.01)

(52) U.S. Cl. ............ 315/300; 315/291; 315/307; 315/209 R; 307/32; 307/112

(58) Field of Classification Search ............ 315/209 R, 315/291, 307, 224, 294, 300, 308; 363/74, 363/76–80; 307/11, 15, 32, 112, 125, 140
See application file for complete search history.

(56) References Cited

U.S. PATENT DOCUMENTS

| | | | | |
|---|---|---|---|---|
| 3,611,338 A | * | 10/1971 | Kramer | 340/659 |
| 5,581,454 A | * | 12/1996 | Collins | 363/59 |
| 6,140,872 A | * | 10/2000 | McEldowney | 330/9 |
| 7,190,210 B2 | * | 3/2007 | Azrai et al. | 327/536 |

* cited by examiner

*Primary Examiner*—Douglas W Owens
*Assistant Examiner*—Jimmy T Vu

(57) ABSTRACT

A circuit arrangement and associated method for splitting current in a predetermined ratio between N sub-circuits, comprising means for splitting current at one end of a each sub-circuit and at least one device at the other end of each sub-circuit adapted to become forward biased and acts as a short to ground.

18 Claims, 4 Drawing Sheets

HIGH VOLTAGE CURRENT SPLITTER CIRCUIT AND METHOD

CROSS REFERENCE TO RELATED APPLICATION

This application claims the benefit of U.S. Provisional Application No. 60/927,865 filed on May 7, 2007, entitled "HIGH VOLTAGE CURRENT SPLITTER METHOD AND CIRCUIT."

TECHNICAL FIELD

The present invention relates to solid state circuits and methods for splitting currents for use in high voltage applications, including but not limited to, Cold Cathode Fluorescent Lamps (CCFL).

BACKGROUND OF THE INVENTION

Cold Cathode Fluorescent Lamps (CCFL) are used as white-light sources to backlight liquid crystal displays (LCDs). CCFLs are sealed glass tubes filled with inert gases. When a high voltage is placed across the tube, the gases ionize creating ultraviolet (UV) light. The UV light, in turn, excites an inner coating of phosphor, creating visible light. An unusual characteristic of CCFLs is that they exhibit negative impedance. This means that the CCFL voltage drops as current increases. Negative impedance can vary between individual CCFLs, causing the CCFLs to have different currents at any particular voltage level. In multiple-CCFL applications, therefore, the most uniform CCFL performance is achieved by providing individual transformers and current control for each CCFL to ensure a regulated current load. This is a costly and complex solution.

In addition to negative impedance, CCFLs also require high voltages for operation. These voltages typically range from between 200 volts and 2000 volts. At start-up, a CCFL requires substantially higher voltages (20% to 100% higher), referred to as strike voltage, to initiate the lamp plasma. CCFL efficiency is also affected by the current waveform driving the CCFL. Although sinusoidal waveforms provide the greatest efficiency, new driving methods have been developed such that it is possible to drive CCFLs at low frequency with either sine or square waveforms (e.g., between 100 Hz and 1 kHz). Disadvantageously, at these frequencies, it is not practical to use transformers for current dividing due to physical size requirements.

What is desired is a solid state circuit and method of splitting currents, without using a pre-assigned channel for current sensing driving slave channels as current mirrors. The present invention overcomes the disadvantages of a fixed master-slave arrangement wherein it is not known which lamp will have the lowest or highest impedance at any given time.

SUMMARY OF THE INVENTION

The present invention is a solid state circuit and method operable to divide a primary current into N sub-currents without using a pre-assigned channel for current sensing driving slave channels as current mirrors. An embodiment of the present invention is a circuit and method to drive a number (N) of CCFLs in parallel as if there were a one single CCFL. More generally, the present invention is a circuit and method to drive N-parallel directional, or bidirectional, elements or loads (identical or not) as if they where a single element. In the present invention, none of the circuit branches act as a dedicated sense line as in a conventional current mirror. This is significant as it is not known which load may have higher or lower impedance. The present invention also ensures a substantially symmetrical branch design. Further, in the present invention, if one of the loads becomes disconnected, the entire circuit is disconnected for power protection. A conventional current mirror cannot offer this level of circuit protection.

To those skilled in the art to which this invention relates, many changes in construction and widely differing embodiments and applications of the invention will suggest themselves without departing from the scope of the invention as defined herein. The present invention is described with respect to CCFLs, which are also referred to generally as lamps, elements or loads. However, the present invention is applicable to solid state circuits and methods for splitting currents for use in any applicable high voltage applications having negative impedance or high impedance elements or loads. The disclosures and the descriptions herein are purely illustrative and are not intended to be in any sense limiting.

BRIEF DESCRIPTION OF THE DRAWINGS

For a better understanding of the present invention including the features, advantages and specific embodiments, reference is made to the following detailed description along with accompanying drawings in which.

DETAILED DESCRIPTION OF A PREFERRED EMBODIMENT

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

The present invention is a solid state based circuit and method for dividing a primary current into a number (N) sub-currents without the need for a pre-assigned channel to sense current to drive slave channels as current mirrors. The present invention is well adapted to drive N-CCFL lamps in parallel as if there were a one single lamp while equally dividing current between N branches. The present invention ensures that all the lamps are turned on simultaneously by using a pure parallel configuration where all lamps have the same current regardless of their impedance.

The present invention can be implemented with discrete electronic parts or, in whole or in part, on an integrated circuit. Circuits 100, 200, 300 and 400 of FIGS. 1 to 4, respectively, illustrate the present invention driving each of the loads RLoad1, Rload2, RLoad3 and RLoad4. For the sake of simplicity, each of circuits 100, 200, 300, and 400 disclose a unipolar configuration implemented in a typical application, although one skilled in the art would appreciate that a bipolar configuration is possible. Such loads shown can specifically comprise CCFLs. As seen therein, when used in driving CCFLs, the circuit arrangement of the present invention splits the current at each end of the lamps. As seen in each of FIGS. 1 to 4, the current is split into sub-circuits at one end of the circuit 101, 201, 301, and 401 ($I_1, I_2, \ldots I_N$) and at the other end of each sub-circuit, a device becomes forward biased and acts as a short to the high side terminal.

Figure 1:
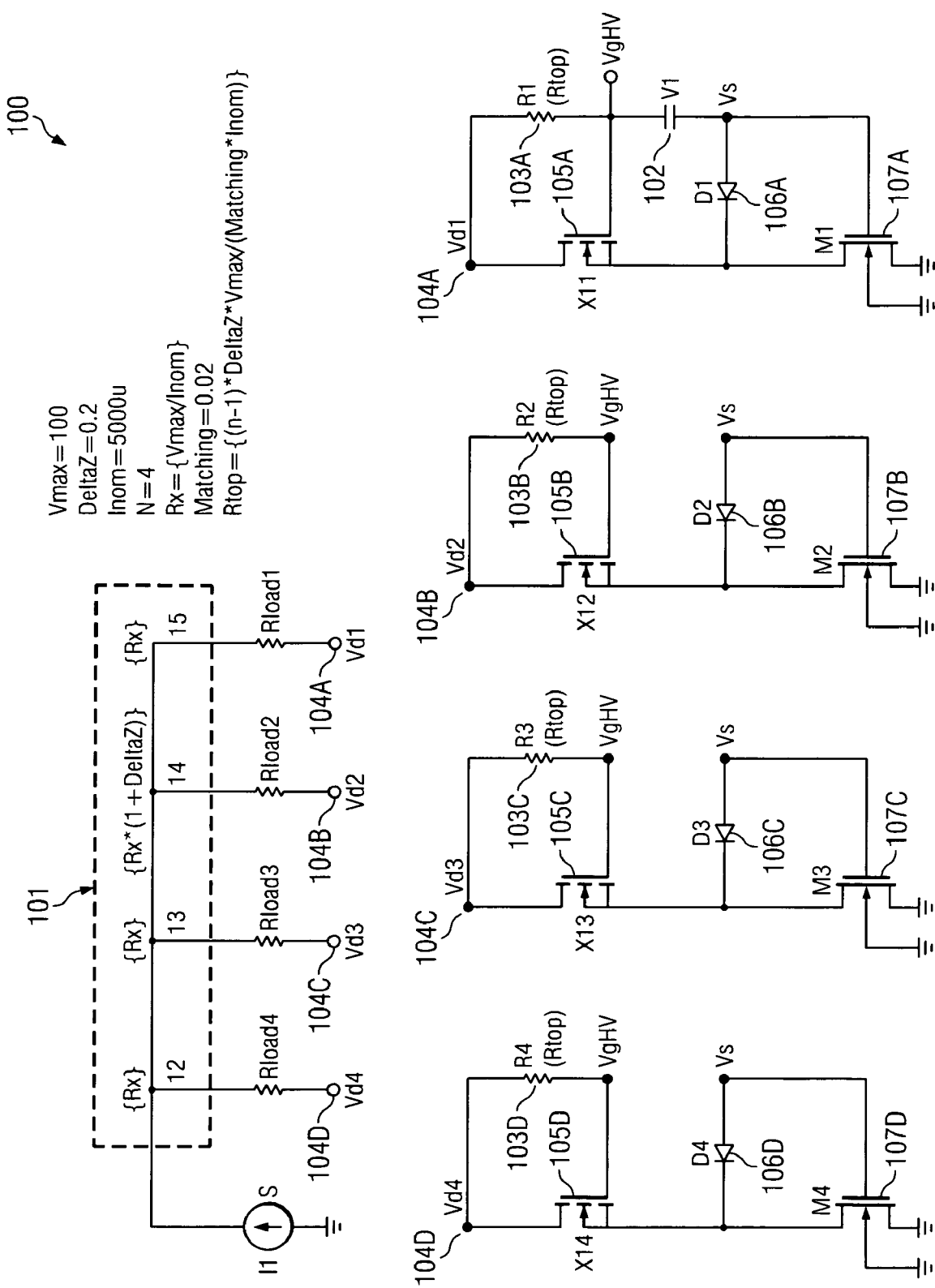
FIG. 1 is a first embodiment of the present invention.

Referring now to FIG. 1, a first embodiment of the present invention is shown in which current is divided in four (4) branches (I2, I3, I4, I5) (each branch also referred to as a sub-circuit), although the present invention can be extended to any N of branch circuits. As seen therein, element $V_1$ 102 is biased by a small current flowing through resistors $R_1$, $R_2$, ... $R_N$, 103A, 103B, 103C and 103D. Element $V_1$ can comprise a bipolar transistor or a MOSFET connected as a diode (gate to drain or base to collector). Element $V_1$ can be any non-linear impedance device having I-V characteristics somewhat similar to a diode.

The node input Vd1, Vd2 ... VdN, 104A, 104B, 104C, and 104D, which has the lowest voltage, pulls down the source of its respective transistor $X_{11}$, $X_{12}$, or $X_{1N}$, 105A, 105B, 105C or 105D and forward biases respective diode $D_1$, $D_2$ or $D_N$, 106A, 106B, 106C or 106D. The voltage across element $V_1$ is chosen such that at some current and bias typical of the load operation conditions, the voltage is sufficient to bias $X_{11}$, $X_{12}$, ... $X_{1N}$, 105A, 105B, 105C or 105D, for the required drain current to flow in saturation. $M_1$, $M_2$, and $M_N$ 107A, 107B, 107C, 107D are current mirrors equally dividing the current while $X_{11}$, $X_{12}$, ... $X_{1N}$ 105A, 105B, 105C, 105D absorb excess voltage. NPN Darlington pairs could be used for the current mirrors $M_1$ to $M_N$, 1-7A, 107B, 107C, 107D however, because of their high input impedance, Field Effect Transistors (FETs) are more practical. Different current ratios can be obtained from $M_1$ to $M_N$, 107A, 107B, 107C, 107D by using FETs with different widths.

As seen in FIG. 1, $R_{TOP}$ can be increased to improve current matching at the expense of slower response. Assuming a given matching requirement (Matching), Maximum bias voltage (Vmax), nominal load current (Inom), and typical load impedance mismatch (DeltaZ), the value of $R_{TOP}$ can be estimated as Rtop=(N−1)*(DeltaZ*Vmax)/(matching*Inom). The element V1 is selected to ensure proper operation pf $M_1$ to $M_N$ and $X_{11}$, $X_{12}$, ... $X_{1N}$ under nominal and extreme bias and environment conditions such as temperature.

Figure 2:
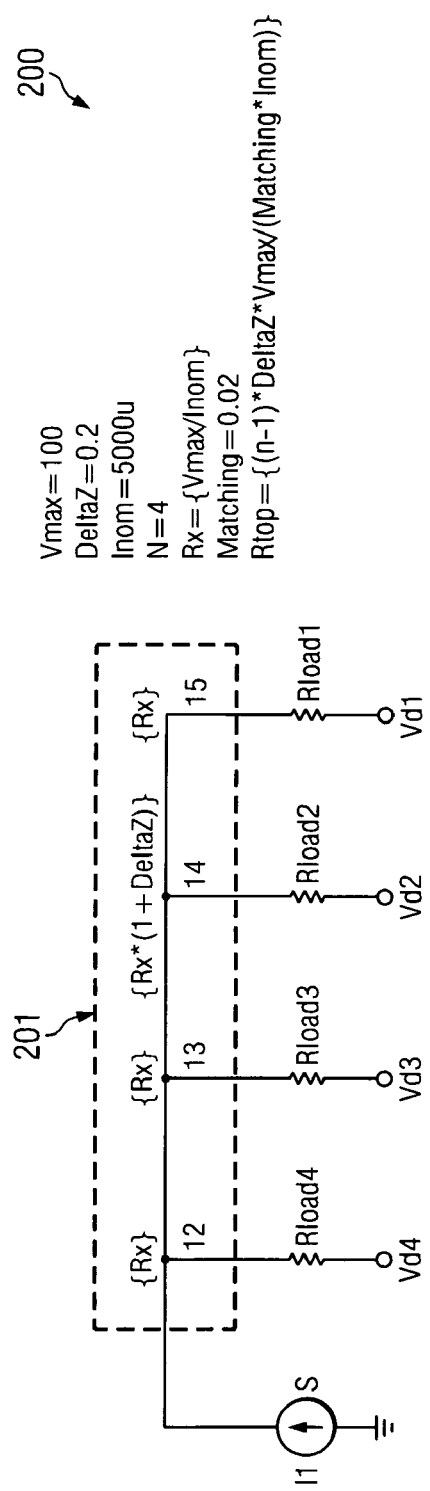
FIG. 2 is a second embodiment of the present invention.
Figure 2:
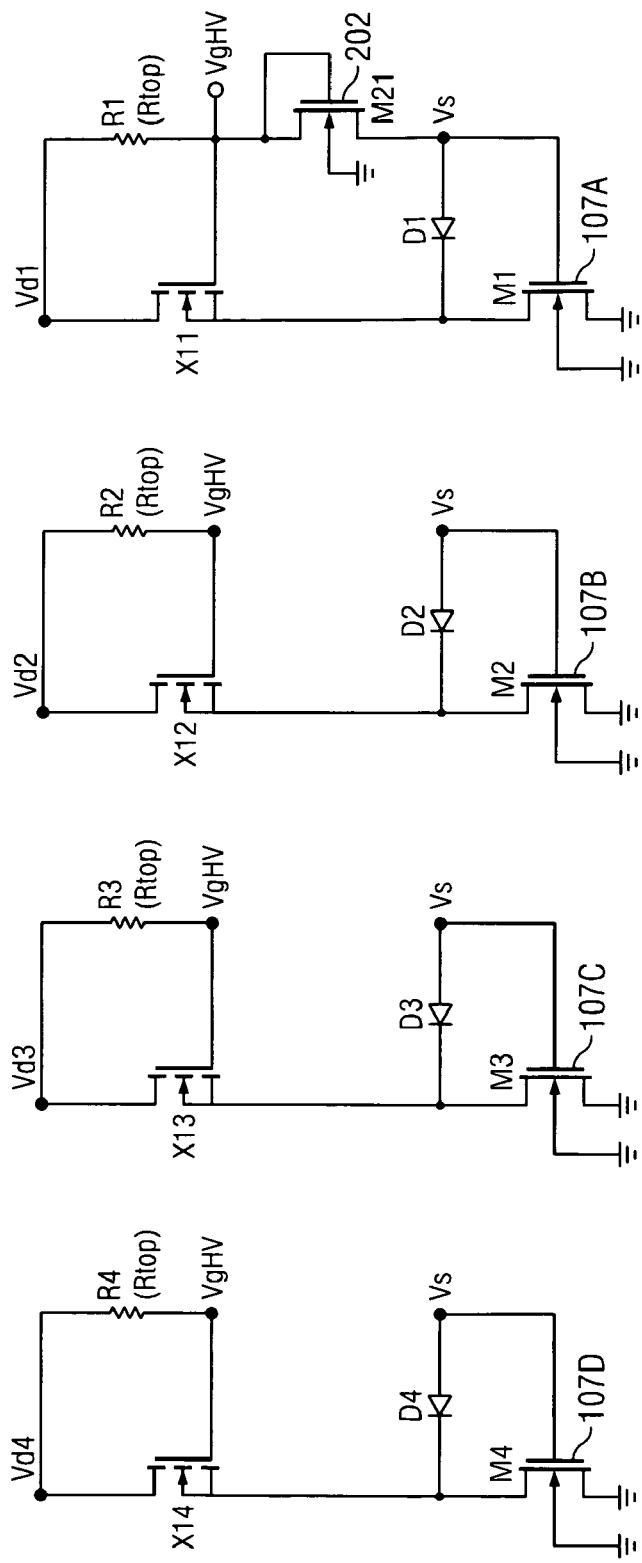

FIG. 2 provides a second embodiment of the circuit 200 of the present invention. The circuit of FIG. 2 is similar to that seen in FIG. 1, provided that element V1 102 is replaced by transistor 202 coupled to nodes Vs, VgHV and ground as seen therein. As seen therein, voltage VgHV is selected to be somewhat higher than the minimum gate-source voltage of $X_{11}$, $X_{12}$, ... $X_{1N}$ 105A, 105B, 105C, 105D to ensure proper operation in saturation. The advantage of this arrangement is that element 202 has a similar temperature coefficient that M1 and X11 thus rendering design of a wide operating temperature circuit easier.

Figure 3:
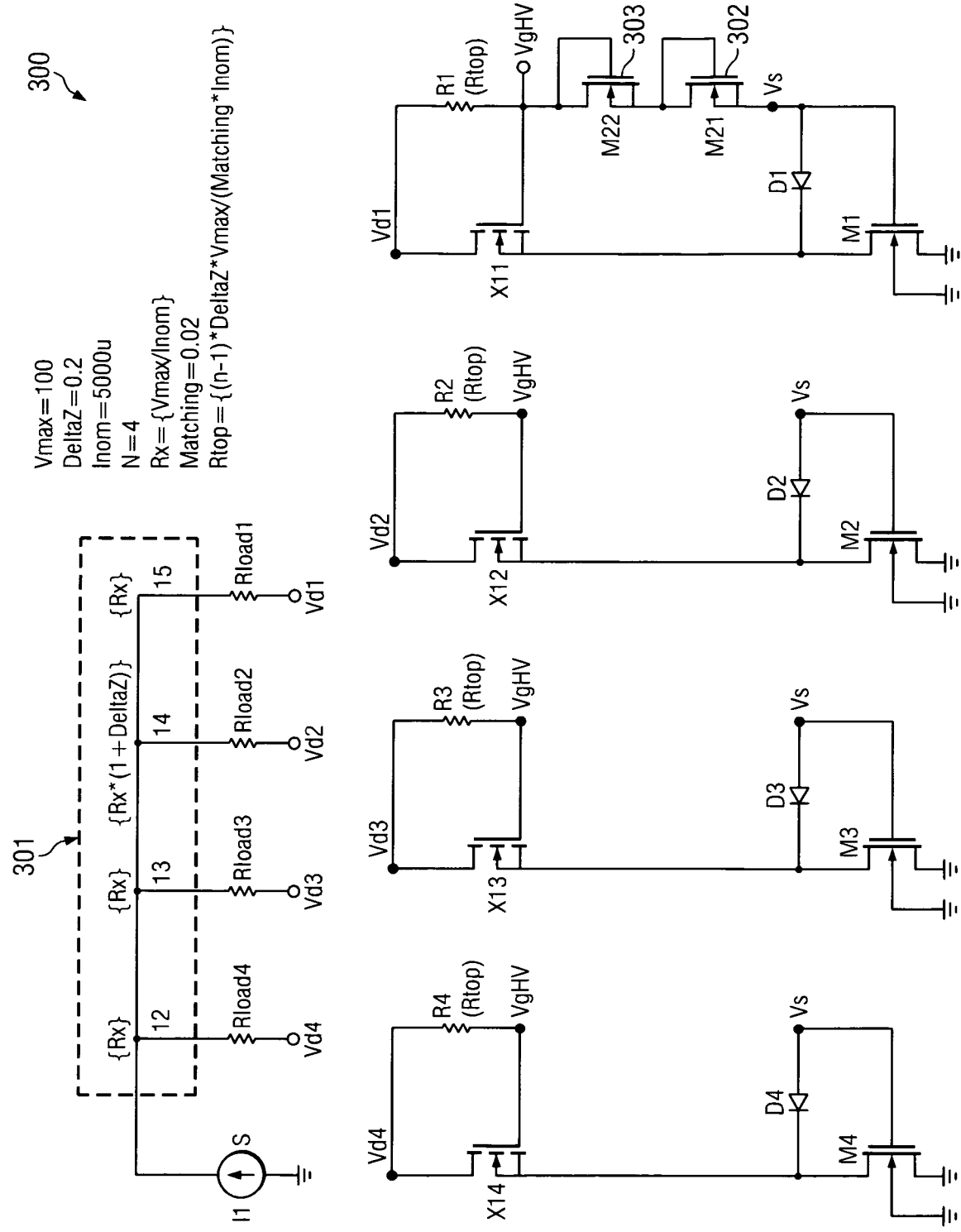
FIG. 3 is a third embodiment of the present invention.

FIG. 3 provides a third embodiment of the circuit 300 of the present invention. The circuit of FIG. 3 is similar to that seen in FIG. 1, provided that element V1 102 is replaced by cascoded transistors 302 and 303. The advantage of this arrangement is the cascode transistors each have smaller voltages across them which reduce the chances of transistor damage during transient thus rendering this design more robust in application where transients are a major concern.

Figure 4:
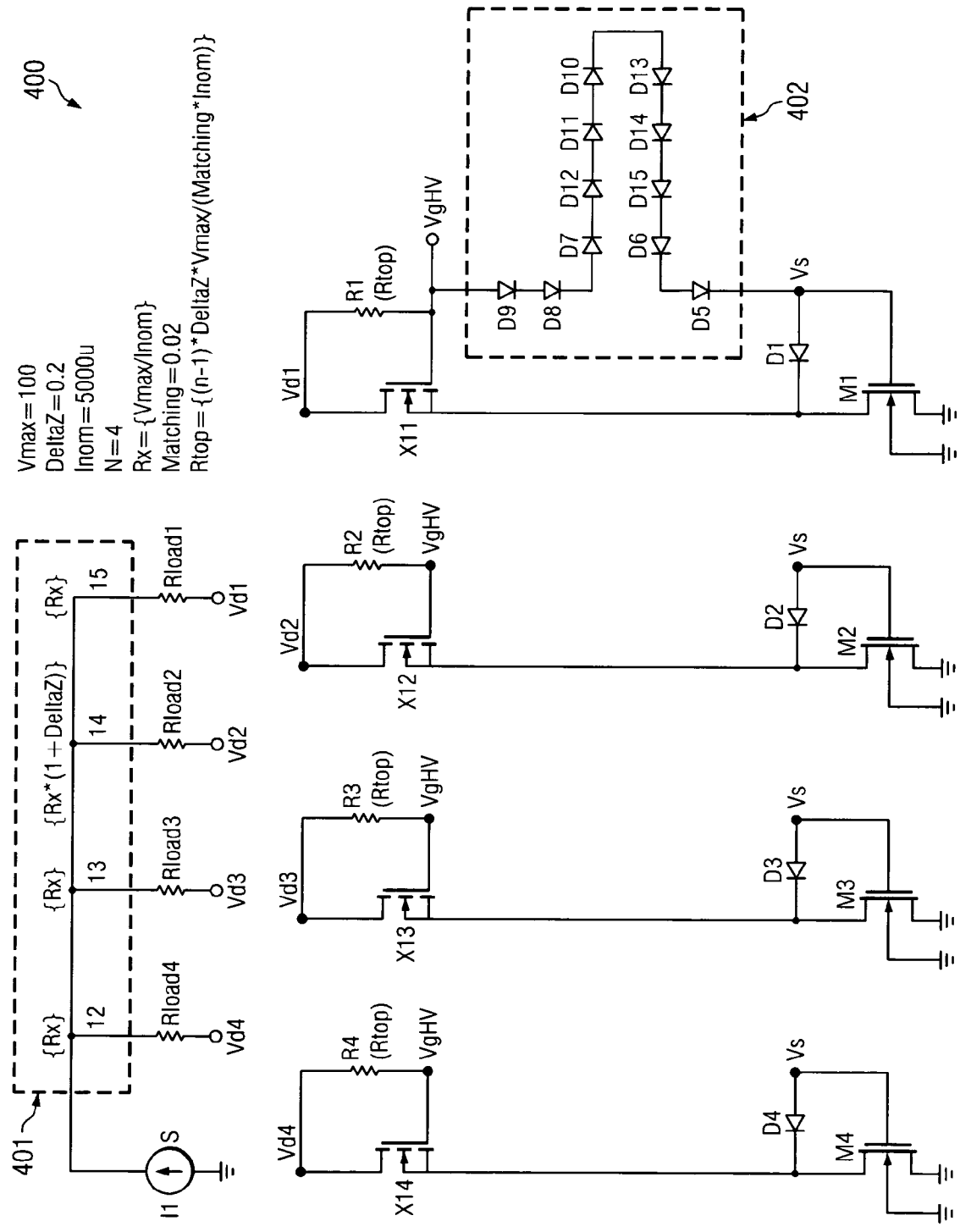
FIG. 4 is a fourth embodiment of the present invention.

FIG. 4 provides a fourth embodiment of the circuit 400 of the present invention. The circuit of FIG. 4 is similar to that seen in FIG. 1, provided that element V1 102 is replaced by a series of diodes 402. The advantage of this arrangement is twofold: First robustness to transient is inherent to diodes since they are free of thin gate oxides; and second in some application it may be desirable to reduce the chance of temperature overrun. This later benefit is possible with this design because the series diodes have a much larger negative temperature coefficient and gradually reduce VGHV with temperature, eventually shutting down $X_{11}$, $X_{12}$, ... $X_{1N}$ 105A, 105B, 105C, 105D.

As seen in the Figures, the circuit arrangement for splitting current has a plurality (N) of lower voltage transistors dividing (N) primary currents, a diode network biased using a secondary current smaller than the primary current coupled to bias the gate/base of said lower voltage transistors with a minimum drain/emitter voltage, a voltage source to bias each of the gates/bases of a plurality of higher voltage transistors from the gates/bases of said lower voltage transistors so to provide necessary voltage compliance and a plurality of resistors to provide secondary current directly from a load current. The lower voltage transistors can be metal oxide semiconductor field effect transistor (MOSFETs) adapted to divide (N) primary currents, wherein the diode network is biased using a secondary current smaller than the primary current coupled to bias the gates of said MOSFETs with a minimum MOSFET drain voltage. The voltage source is thus adapted to bias each of the gates of the plurality of high voltage transistors from the gates of said MOSFETs so to provide necessary voltage compliance, and the plurality of resistors provides secondary current directly from a load current. The MOSFETs can be cascoded.

Alternatively, the lower voltage transistors can be bipolar transistors or arranged as Darlington bipolar transistors. The voltage source can be a series of diodes, a series of bipolar transistors, a series of MOSFETs coupled to act as diodes, a series of bipolar transistors coupled to act as diodes, a MOSFET with its body coupled to ground, its source coupled to its gate, and its drain coupled to its gate, or a MOSFET network coupled so as to provide a common gate of said MOSFETs with a minimum drain voltage. The MOSFET network can be coupled such that the common gate of the MOSFETs has a sense circuitry to provide either an all open or all short condition to allow for different response to load failure conditions.

The present invention provides numerous advantages over conventional circuits and methods. The present invention is operable from DC to an intermediate frequency of about 10 kHz depending on the actual characteristics of individual components, or those of the selected technology for implementation in an IC or chip. The present invention can be integrated onto a single CMOS integrated circuit, providing a small footprint. In the present invention, current can be divided according to any ratio between the channels—that is, it is not required that each channel receive the same current. Because the present invention does not use mechanical transformers, is more reliable than circuits that use transformers. The present invention is not prone to arcing and other mechanical failures, as are normally found in transformers. The present invention provides accurate current splitting, typically better than 5%, even with 100 volts of differential voltage, assuming components $M_1$ to $M_N$ are well matched. Operation in reverse bias results in all channels behaving as separate equivalent diodes sharing the same high voltage terminal (ground in Circuits 100 to 400). In this bias condition current simply flows from the high voltage point (ground) to node 104A, 104B, 104C, 104D thru drain-source diodes M1-X11, M2-X12, M3-X13, and M4-X14) to the load. The presence of another identical circuit connected to the other load terminal (not shown in Circuits 100-400) results in the reverse currents being equal in each load.

The present invention is well adapted to drive CCFL lamps from DC to about 10 kHz depending on individual component characteristics. As noted, it is impractical to use transformers in the described circuits that use low frequencies, yet there are significant advantages of using lower frequencies. For example, capacitive losses are substantial in typical 30 kHz to 70 kHz CCFL circuits. These are proportionally reduced when operation is allowed at lower frequencies as facilitated by the present invention. This reduction in losses provides for a more power efficient system.

While the present invention has been described with respect to its use in CCFL displays using multiple lamps, it can also be used in cardiac defibrillators using multiple poles and in other high voltage, high impedance or negative impedance multiple load systems. The present invention also has application in Hot Cathode Fluorescent Lamp (HCFL) current ballasting and serial light emitting diodes (LEDs).

The embodiments shown and described above are only exemplary. Even though numerous characteristics and advantages of the present invention have been set forth in the foregoing description together with details of the circuits and methods of the present invention, the disclosure is illustrative only and changes may be made within the principles of the invention to the full extent indicated by the broad general meaning of the terms used herein. Various alterations, modifications and substitutions can be made to the circuits and methods of the disclosed invention and the system that implements the present invention without departing in any way from the spirit and scope of the invention.

I claim:

1. A circuit arrangement, comprising means for splitting current in a predetermined ratio between N-sub-circuits, wherein such means for splitting current comprises:
   a plurality of lower voltage transistors dividing primary currents;
   a diode network biased using a secondary current smaller than the primary current coupled to bias the gate/base of said lower voltage transistors with a minimum drain/emitter voltage;
   a voltage source to bias each of the gates/bases of a plurality of higher voltage transistors from the gates/bases of said lower voltage transistors so to provide necessary voltage compliance; and
   a plurality of resistors to provide secondary current directly from a load current.

2. The circuit arrangement of claim 1, wherein the lower voltage transistors are metal oxide semiconductor field effect transistor (MOSFETs) adapted to divide primary currents, the diode network is biased using a secondary current smaller than the primary current coupled to bias the gates of said MOSFETs with a minimum MOSFET drain voltage, the voltage source is adapted to bias each of the gates of the plurality of high voltage transistors from the gates of said MOSFETs so to provide necessary voltage compliance, and the plurality of resistors provide secondary current directly from a load current.

3. The circuit arrangement of claim 2 wherein the MOSFETs are cascoded.

4. The circuit arrangement of claim 1, wherein the lower voltage transistors are bipolar transistors.

5. The circuit arrangement of claim 1, wherein the lower voltage transistors are arranged as Darlington bipolar transistors.

6. The circuit arrangement of claim 1 wherein the voltage source further comprises a series of diodes.

7. The circuit arrangement of claim 1 wherein the voltage source further comprises a series of bipolar transistors.

8. The circuit arrangement of claim 1 wherein the voltage source further comprises a series of MOSFETs coupled to act as diodes.

9. The circuit arrangement of claim 1 wherein the voltage source further comprises a series of bipolar transistors coupled to act as diodes.

10. The circuit arrangement of claim 1 wherein the voltage source further comprises a MOSFET with its body coupled to ground, its source coupled to its gate, and its drain coupled to its gate.

11. The circuit arrangement of claim 1 wherein the voltage source further comprises a MOSFET network coupled so as to provide a common gate of said MOSFETs with a minimum drain voltage.

12. The circuit arrangement of claim 11 wherein the MOSFET network is coupled such that the common gate of said MOSFETs has a sense circuitry to provide either an all open or all short condition to allow for different response to load failure conditions.

13. A method of arranging a circuit, comprising the step of:
    splitting current at a node of at least one sub-circuit, said sub-circuit having at least one device at the another end of such sub-circuit adapted to become forward biased and act as a short when the circuit is biased in reverse respective to its current splitting operation normal bias operation, wherein such means for splitting current comprises the further steps of:
    providing a plurality of lower voltage transistors to divide primary currents;
    biasing a diode network using a secondary current smaller than the primary current coupled to bias the gate/base of said lower voltage transistors with a minimum drain/emitter voltage;
    biasing, with a voltage source, each of the gates/bases of a plurality of higher voltage transistors from the gates/bases of said lower voltage transistors so to provide necessary voltage compliance; and
    providing, via a plurality of resistors, a secondary current directly from a load current.

14. The method of claim 13, wherein the lower voltage transistors are metal oxide semiconductor field effect transistor (MOSFETs) adapted to divide primary currents, the diode network is biased using a secondary current smaller than the primary current coupled to bias the gates of said MOSFETs, with a minimum MOSFET drain voltage, the voltage source is adapted to bias each of the gates of the plurality of high voltage transistors from the gates of said MOSFETs so to provide necessary voltage compliance, and the plurality of resistors provide secondary current directly from a load current.

15. The method of claim 13 wherein the MOSFETs are cascoded.

16. The method of claim 13, wherein the lower voltage transistors are bipolar transistors.

17. The method of claim 13, wherein the lower voltage transistors are arranged as Darlington bipolar transistors.

18. The method of claim 13 wherein the voltage source further comprises a series of diodes.

* * * * *